(12) United States Patent
Mouradian et al.

(10) Patent No.: US 12,375,356 B2
(45) Date of Patent: Jul. 29, 2025

(54) METHOD AND APPARATUS FOR INFRASTRUCTURE CAPABILITY AGGREGATION AND EXPOSURE

(71) Applicant: Telefonaktiebolaget LM Ericsson (publ), Stockholm (SE)

(72) Inventors: Carla Mouradian, Montreal (CA); Wubin Li, Kirkland (CA); Róbert Szabó, Budapest (HU); Ákos Recse, Halasztelek (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/569,757

(22) PCT Filed: Jun. 15, 2021

(86) PCT No.: PCT/IB2021/055236
§ 371 (c)(1),
(2) Date: Dec. 13, 2023

(87) PCT Pub. No.: WO2022/263877
PCT Pub. Date: Dec. 22, 2022

(65) Prior Publication Data
US 2024/0283705 A1    Aug. 22, 2024

(51) Int. Cl.
*H04L 41/12* (2022.01)
*H04L 41/0806* (2022.01)
*H04L 41/0895* (2022.01)

(52) U.S. Cl.
CPC .......... *H04L 41/12* (2013.01); *H04L 41/0806* (2013.01); *H04L 41/0895* (2022.05)

(58) Field of Classification Search
CPC .................. H04L 41/12; H04L 41/0895; H04L 41/085; H04L 47/822; H04L 43/0805; H04L 5/0058; H04L 5/0057
See application file for complete search history.

(56) References Cited

U.S. PATENT DOCUMENTS 10,210,246 B2    2/2019  Stojanovic et al.
2012/0198073 A1*  8/2012  Srikanth ................ H04L 67/10
                                              709/226

(Continued)

OTHER PUBLICATIONS

International Search Report and Written Opinion mailed Mar. 1, 2022 in corresponding PCT Application No. PCT/IB2021/055236 (13 pages).

(Continued)

*Primary Examiner* — Tonia L Dollinger
*Assistant Examiner* — Linh T. Nguyen
(74) *Attorney, Agent, or Firm* — Rothwell, Figg, Ernst & Manbeck, P.C.

(57) ABSTRACT

A computer-implemented method for aggregating and exposing infrastructure capability information is provided. The method includes extracting infrastructure capability information, wherein the infrastructure capability information includes available resource types and, for each available resource type, first attribute information including a first attribute name and a first attribute value. The method further includes, for each available resource type: determining whether the first attribute value is a literal type attribute value or a numerical type attribute value; for an attribute value determined to be the literal type, aggregating the first attribute information to generate aggregated literal attributes information; and for an attribute value determined to be the numerical type, aggregating the first attribute information to generate aggregated numerical attributes information. The method further includes receiving a request for a resource including requested resource types and, for each requested resource type, second attribute information including a second attribute name and a second attribute value. The method further includes, for each requested resource type: determining whether the second attribute value is a literal type attribute value or a numerical type attribute value; for an (Continued)

attribute value determined to be the literal type, processing the second attribute information to generate processed second attribute information and comparing the processed second attribute information with the aggregated literal attributes information to determine whether the requested resource matches the available resource types; and for an attribute value determined to be the numerical type, comparing the second attribute information with the aggregated numerical attributes information to determine whether the requested resource matches the available resource types.

20 Claims, 17 Drawing Sheets

(56) References Cited

U.S. PATENT DOCUMENTS

| | | |
|---|---|---|
| 2012/0226789 A1 | 9/2012 | Ganesan et al. |
| 2018/0089287 A1* | 3/2018 | Haggie ................. G06F 16/285 |
| 2019/0065851 A1* | 2/2019 | Cardis .................... H04N 23/64 |
| 2019/0163736 A1* | 5/2019 | Sharma ................. G06F 16/951 |
| 2019/0197175 A1* | 6/2019 | Purcell ................ G06F 16/2453 |
| 2020/0184082 A1 | 6/2020 | Fu et al. |
| 2021/0132981 A1* | 5/2021 | Thakkar ................ G06F 9/5077 |

OTHER PUBLICATIONS

Verizon, "Verizon Network Infrastructure Planning SND-NFV Reference Architecture" Version 1.0, Feb. 2016 (220 pages).

* cited by examiner

METHOD AND APPARATUS FOR INFRASTRUCTURE CAPABILITY AGGREGATION AND EXPOSURE

CROSS REFERENCE TO RELATED APPLICATION(S)

This application is a 35 U.S.C. § 371 National Phase Entry Application from PCT/IB2021/055236, filed Jun. 15, 2021, designating the United States.

TECHNICAL FIELD

Disclosed are embodiments related to a method and apparatus for infrastructure capability aggregation and exposure.

BACKGROUND

In today's large-scale distributed cloud environments, there are usually multiple layers involved when performing orchestration, such as, for example, cluster orchestrators (e.g., Kurbernetes (K8S)), Virtualized Infrastructure Manager/Wide Area Network Infrastructure Manager (VIM/WIM), Virtual Network Function Manager (VNFM), Network Function Virtualization Orchestrator (NFVO), service orchestrator, broker, etc. To enable workload placement with specific hardware requirements in such distributed cloud environment it is important to decide what is visible about a specific hardware capability at a specific physical location in the different layers of abstraction.

Considering data center sites (or clusters), they have heterogeneous hardware accelerators with different capabilities. These capabilities and their attributes may vary over time. It is critical to decide how data centers/clusters aggregate and expose their hardware capabilities to the user to be accessible from the deployment environment.

This exposure might include some uncertainties resulting from the aggregation and information hiding. Hence, it is also important to decide how workloads are assigned to the proper resources to maximize the likelihood of the match across the layers and successful allocation.

Current approaches that attempt to address these issues include Open Network Automation Platform (ONAP) (https://www.onap.org/), Open Source MANO (OSM) (https://osm.etsi.org/), Openstack (https/www.openstack.org/), and Common NFVI Telco Task Force or Cloud infrastructure Telco Task Force (CNTT) (https://cntt-n.github.io/CNTT/).

ONAP presents a cloud infrastructure model with different aggregation classes e.g., resource slice, resource cluster, physical data center endpoint, etc. In addition, hardware platform feature awareness (HPA) requirement and capability specification of ONAP perform requirement/capability matchmaking. During network service and VNF instantiation, the required capabilities are matched against the hardware capabilities. If all mandatory requirements have been matched, the instantiation continues. If one or more mandatory requirements have not been matched, the instantiation fails.

OSM defines descriptors that enable network function (NF) suppliers and network service (NS) providers to deploy VNFs quickly and easily in a cost-efficient manner. These descriptors include Network Service Descriptor (NSD), Virtual Network Function Descriptor (VNFD), Virtual Link Descriptor (VLD), VNF Forwarding Graph Descriptor (VNF-FGD), and Physical Network Functions (PNFs).

Openstack provides a concept called host aggregates which is a mechanism for partitioning hosts in an Openstack cloud or a region of Openstack cloud based on arbitrary characteristics. Administrators map flavors to host aggregates by setting metadata on a host aggregate and matching flavor extra specification. The scheduler then matches user requests of a given flavor to a host aggregate with the same key-value pair in its metadata.

CNTT defines descriptors for the capabilities provided by the infrastructure and the performance measurements generated by the infrastructure. For each descriptor, they define whether it is an external (exposed to a VNF) or internal (exposed to components within NFVI).

Each of these current approaches has a number of drawbacks.

SUMMARY

Drawbacks associated with these current approaches include, for example, exposing too many (excessive) details of the hardware capabilities, which makes them inefficient and non-applicable for large-scale systems; utilizing a strict format or following a specific standard, which makes them inflexible; requiring expert knowledge; and using deterministic matching of user requirements that requires an accurate information description both on the user side and the vendor side.

Embodiments disclosed herein address these drawbacks associated with the current approaches by providing a method for infrastructure capability aggregation and exposure. In exemplary embodiments, the method relies on the detailed information of the underlying hardware resource which can be extracted using, for example, OS built-in tools. The method then aggregates this information treating the literal capabilities and the numerical ones differently. The aggregated model is exposed then to the matching function, whose responsibility is to match the user request with the aggregated model. The aim is to maximize the likelihood of the match between the user request and the aggregated model to enable workload placement with specific hardware requirements in distributed cloud environments.

Embodiments disclosed herein do not rely on any prior knowledge of hardware, and the hardware resource information can be extracted by using commonly used commands which are provided by operating systems, such as, for example, lshw in Linux. In addition to hardware, the novel approach disclosed herein can also be applied to software capabilities and physical network functions capabilities.

Embodiments disclosed herein also advantageously preserve confidentiality and privacy. This novel approach does not need to explicitly expose the internal details of the underlying hardware.

Embodiments disclosed herein also provide the necessary scalability and flexibility lacking in the current approaches. The novel methods of embodiments disclosed herein are efficient enough to handle information extracted from large scale systems and can tolerate inaccurate descriptions of user requirements.

According to a first aspect, a computer-implemented method for aggregating and exposing infrastructure capability information is provided. The method includes extracting infrastructure capability information, wherein the infrastructure capability information includes available resource types and, for each available resource type, first attribute information including a first attribute name and a first attribute value. The method further includes, for each available resource type: determining whether the first attribute value is a literal type attribute value or a numerical type attribute value: for an attribute value determined to be the literal type, aggregating the first attribute information to generate aggregated literal attributes information; and for an attribute value determined to be the numerical type, aggregating the first attribute information to generate aggregated numerical attributes information. The method further includes receiving a request for a resource including requested resource types and, for each requested resource type, second attribute information including a second attribute name and a second attribute value. The method further includes, for each requested resource type: determining whether the second attribute value is a literal type attribute value or a numerical type attribute value; for an attribute value determined to be the literal type, processing the second attribute information to generate processed second attribute information and comparing the processed second attribute information with the aggregated literal attributes information to determine whether the requested resource matches the available resource types; and for an attribute value determined to be the numerical type, comparing the second attribute information with the aggregated numerical attributes information to determine whether the requested resource matches the available resource types.

In some embodiments, extracting infrastructure capability information includes extracting the infrastructure capability information using one or more operating system commands.

In some embodiments, resource types are one or more of: computing resources, hardware resources, software resources, and physical network function (PNF) resources.

In some embodiments, determining whether the first attribute value or the second attribute value is a literal type attribute value includes determining whether the first attribute value or the second attribute value is a text string.

In some embodiments, determining whether the first attribute value or the second attribute value is a numerical type attribute value includes determining whether the first attribute value or the second attribute value is an integer or a floating point number.

In some embodiments, aggregating the first attribute information to generate aggregated literal attributes information includes: determining whether the first attribute information is unnecessary: if the first attribute information is not unnecessary, converting the first attribute name and first attribute value to uppercase: parsing the converted first attribute value to identify each segment and generating first segment combinations: ordering the generated first segment combinations alphabetically; for each first segment combination: generating a string sequence S by adding the resource type and the first attribute name to the segment combination; and storing string sequence S to a Bloom filter.

In some embodiments, aggregating the first attribute information to generate aggregated literal attributes information includes: determining whether the first attribute information is unnecessary; if the first attribute information is not unnecessary, converting the first attribute name and first attribute value to uppercase; parsing the converted first attribute value to identify each word: for each word: generating a string sequence S by adding the resource type and the first attribute name to the word; and storing string sequence S to a Bloom filter.

In some embodiments, aggregating the first attribute information to generate aggregated numerical attributes information includes: extracting the first attribute name K from the first attribute information: extracting the first attribute value V from the first attribute information: carrying out a first aggregation function according to: $SUM_K \leftarrow SUM_K + V$; and carrying out a second aggregation function according to: $MAX_K \leftarrow MAX(MAX_K, V)$.

In some embodiments, processing the second attribute information to generate processed second attribute information includes: parsing the second attribute value to identify each segment and generating second segment combinations; for each second segment combination: ordering the generated second segment combinations alphabetically; converting the generated second segment combinations to uppercase; and adding the resource type and the second attribute name to the second segment combination.

In some embodiments, comparing the processed second attribute information with the aggregated literal attributes information to determine whether the requested resource matches the available resource types includes: for each second segment combination: comparing the second segment combination with the aggregated literal attributes information stored in the Bloom filter; and determining whether a pre-determined matching threshold is met based on the comparison.

In some embodiments, comparing the second attribute information with the aggregated numerical attributes information to determine whether the requested resource matches the available resource types includes: determining a match if the second attribute value is less than the value of SUM and less than the value of MAX.

According to a second aspect, an apparatus is provided. The apparatus includes processing circuitry and a memory containing instructions executable by the processing circuitry for aggregating and exposing infrastructure capability information, and is operative to: extract infrastructure capability information, wherein the infrastructure capability information includes available resource types and, for each available resource type, first attribute information including a first attribute name and a first attribute value. The apparatus is further operative to, for each available resource type: determine whether the first attribute value is a literal type attribute value or a numerical type attribute value: for an attribute value determined to be the literal type, aggregate the first attribute information to generate aggregated literal attributes information; and for an attribute value determined to be the numerical type, aggregate the first attribute information to generate aggregated numerical attributes information. The apparatus is further operative to receive a request for a resource including requested resource types and, for each requested resource type, second attribute information including a second attribute name and a second attribute value. The apparatus is further operative to, for each requested resource type: determine whether the second attribute value is a literal type attribute value or a numerical type attribute value; for an attribute value determined to be the literal type, process the second attribute information to generate processed second attribute information and compare the processed second attribute information with the aggregated literal attributes information to determine whether the requested resource matches the available resource types; and for an attribute value determined to be the numerical type, compare the second attribute information with the aggregated numerical attributes information to determine whether the requested resource matches the available resource types.

The apparatus according to the second aspect includes processing circuitry and a memory containing instructions executable by the processing circuitry that causes the apparatus to perform the method of any one of the embodiments of the first aspect.

According to a third aspect, a node is provided. The node is configured for aggregating and exposing infrastructure capability information in a network using the apparatus of the second aspect.

According to a fourth aspect, a computer program is provided. The computer program includes instructions which when executed by processing circuitry causes the processing circuitry to perform the method of any one of the embodiments of the first aspect.

According to a fifth aspect, a carrier is provided. The carrier contains the computer program of the fourth aspect and is one of an electronic signal, an optical signal, a radio signal, and a computer readable storage medium.

BRIEF DESCRIPTION OF THE DRAWINGS

The accompanying drawings, which are incorporated herein and form part of the specification, illustrate various embodiments.

DETAILED DESCRIPTION

Figure 1:
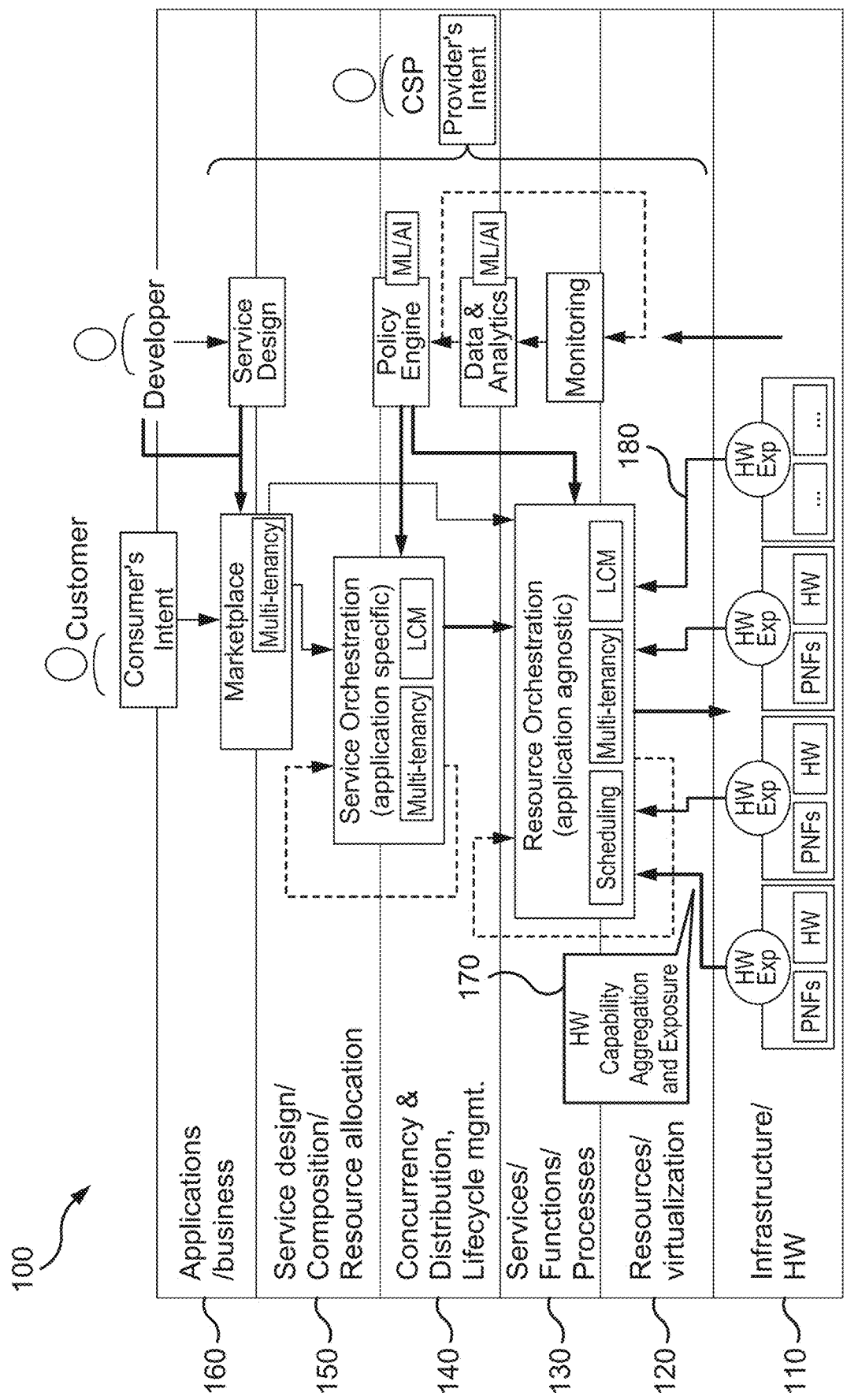
FIG. 1 illustrates an exemplary view of an orchestration architecture for a distributed cloud environment according to some embodiments.

Before describing in detail exemplary embodiments, it is noted that the embodiments reside primarily in combinations of processing steps and apparatus components related to infrastructure capability aggregation and exposure in distributed cloud environments. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

Embodiments of the method and apparatus for infrastructure capability aggregation and exposure disclosed herein can be implemented and used within any distributed or centralized cloud system. Moreover, while exemplary embodiments are described with reference to a distributed cloud environment, it should be understood that the techniques disclosed herein may be beneficial and applicable to other types of computing environments in which infrastructure capability aggregation and exposure is a problem.

Any two or more embodiments described in this disclosure may be combined in any way with each other. Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring now to FIG. 1, FIG. 1 illustrates an exemplary view of an orchestration architecture 100 for a distributed cloud environment according to some embodiments. In large-scale cloud environments, as illustrated in FIG. 1, there are usually multiple layers involved when performing orchestration. The orchestration architecture 100 includes multiple layers: Infrastructure/HW 110, Resources/virtualization 120, Services/Functions/Processes 130, Concurrency & Distribution, Lifecycle mgmt. 140, Service design/Composition/Resource allocation 150, and Applications/business 160. The method and apparatus for infrastructure capability aggregation and exposure disclosed herein can be applied to the Infrastructure/HW layer 110. HW capability aggregation and exposure 170, as illustrated in FIG. 1, provides for aggregation and exposure of a simplified view of the HW/Infrastructure resources 180 to the upper stack layers 120 to 160 of the architecture to enable workload placement with specific hardware requirements in distributed cloud environments.

Figure 2:
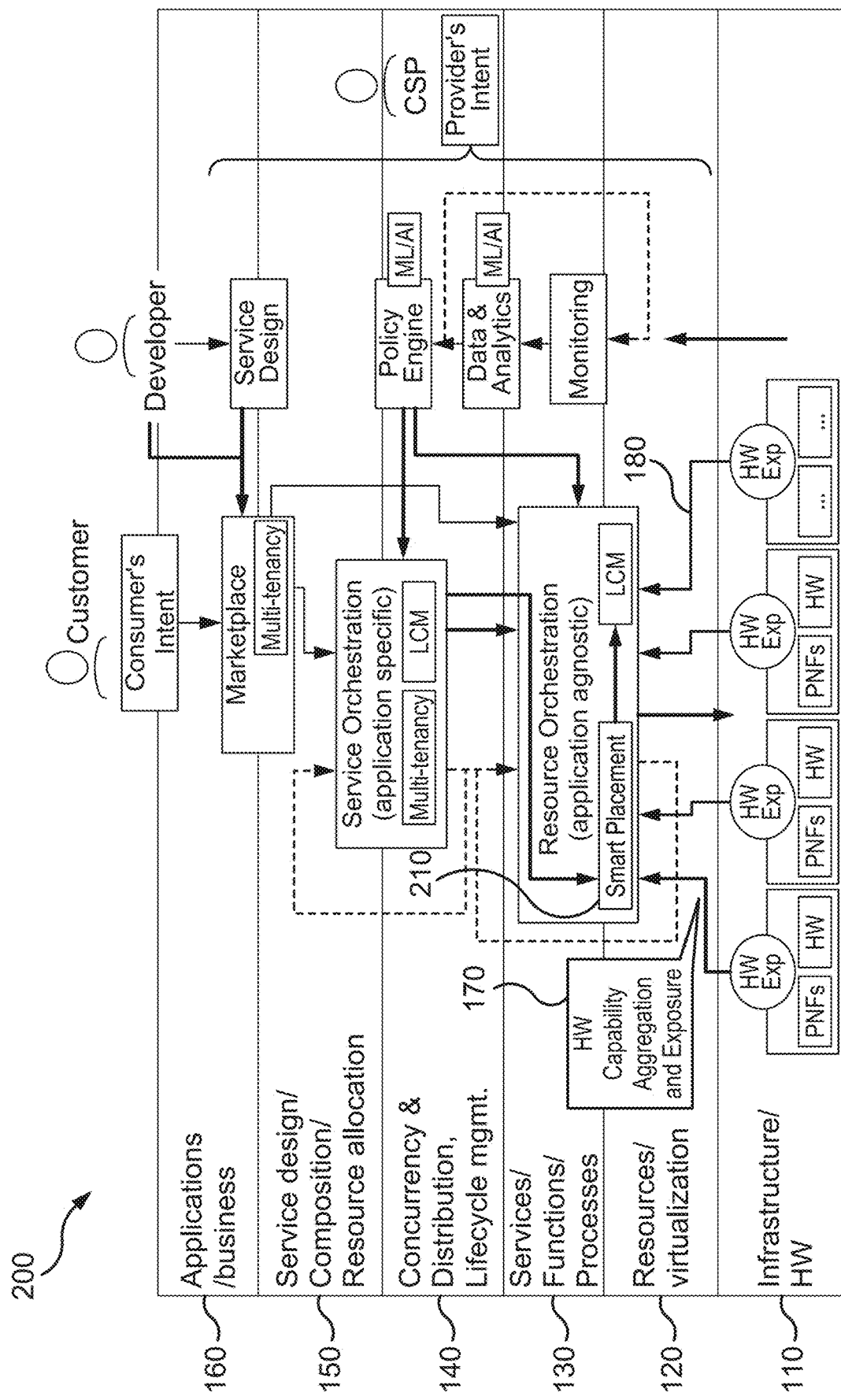
FIG. 2 illustrates an exemplary view of an orchestration architecture for a distributed cloud environment according to some embodiments.

Referring now to FIG. 2, FIG. 2 illustrates the same exemplary view of an orchestration architecture 200 for a distributed cloud environment according to some embodiments, as illustrated in FIG. 1. The orchestration architecture 200 illustrated in FIG. 2 shows the "Smart Placement" 210 enabling workload placement with specific hardware requirements by using the novel method and apparatus for infrastructure capability aggregation and exposure disclosed herein.

Figure 3A:
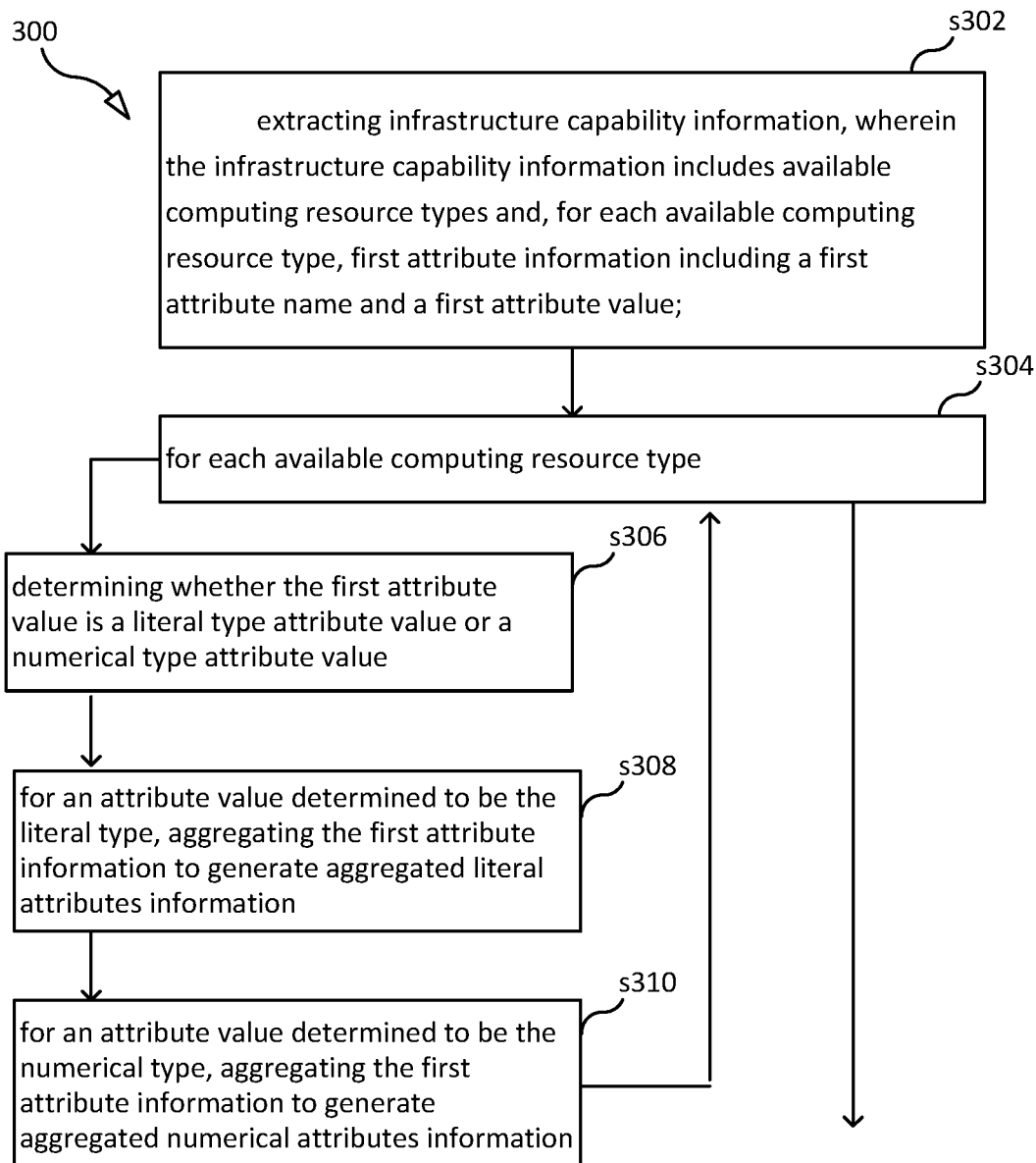
FIG. 3A is a flow chart illustrating a process according to some embodiments.

FIG. 3A is a flowchart illustrating a process 300 according to some embodiments. Process 300 is a computer-implemented method for aggregating and exposing infrastructure capability information. Process 300 may begin with step s302.

Step s302 comprises extracting infrastructure capability information, wherein the infrastructure capability information includes available resource types and, for each available resource type, first attribute information including a first attribute name and a first attribute value.

Step s304 comprises, for each available resource type: performing step s306, determining whether the first attribute value is a literal type attribute value or a numerical type attribute value; step s308, for an attribute value determined to be the literal type, aggregating the first attribute information to generate aggregated literal attributes information; and step s310, for an attribute value determined to be the numerical type, aggregating the first attribute information to generate aggregated numerical attributes information.

Figure 3B:
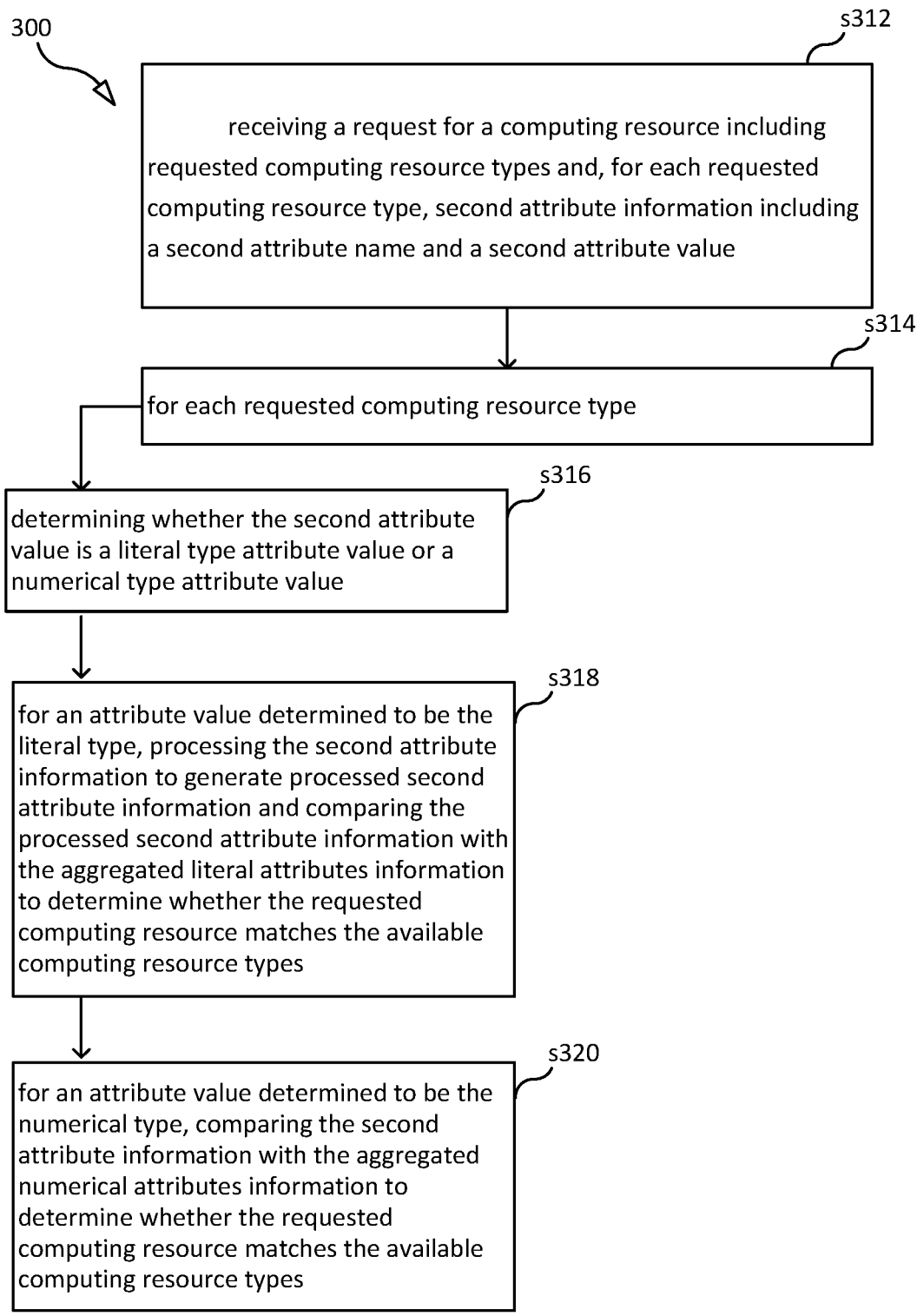
FIG. 3B is a flow chart illustrating a process according to some embodiments.

The process 300 continues with reference to FIG. 3B. Step s312 comprises receiving a request for a resource including requested resource types and, for each requested resource type, second attribute information including a second attribute name and a second attribute value.

Step s314 comprises, for each requested resource type: performing step s316, determining whether the second attribute value is a literal type attribute value or a numerical type attribute value: step s318, for an attribute value determined to be the literal type, processing the second attribute information to generate processed second attribute information and comparing the processed second attribute information with the aggregated literal attributes information to determine whether the requested resource matches the available resource types; and step s320, for an attribute value determined to be the numerical type, comparing the second attribute information with the aggregated numerical attributes information to determine whether the requested resource matches the available resource types.

Aggregation Function

Figure 4:
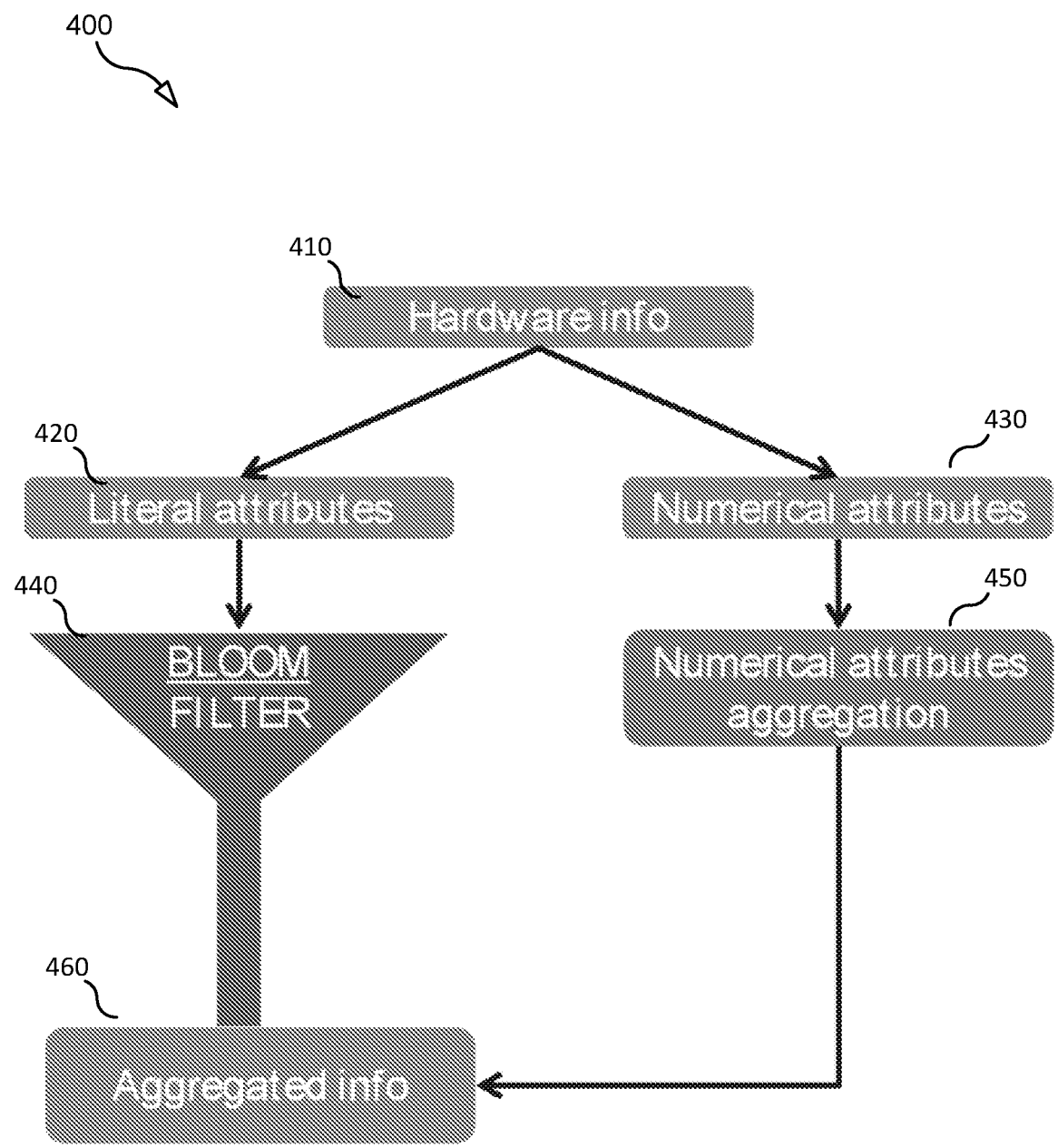
FIG. 4 is a flow diagram illustrating an exemplary aggregation function according to some embodiments.

FIG. 4 is a flow diagram illustrating an exemplary aggregation function according to some embodiments. Aggregation function 400 provides for the extraction of, for example, hardware information 410. An example of hardware information that is extracted from the infrastructure is the following:

```
{
:       "id": "multimedia",
:       "class": "multimedia",
:       "claimed": true,
:       "handle": "PCI: 0000:02:00.1",
:       "description": "Audio device",
:       "product": "GP102 HDMI Audio Controller",
:       "vendor": "NVIDIA Corporation",
:       "physid": "0.1",
:       "businfo": "pci@0000:02:00.1",
:       "version": "a1",
:       "width": 32,
:       "clock": 33000000,
:       "configuration": {
:         "driver": "snd_hda_intel",
:         "latency": "0",
:       },
:       "capabilities": {
:         "pm": "Power Management",
:         "msi": "Message Signalled Interrupts",
:         "pciexpress": "PCI Express",
:         "bus_master": "bus mastering",
:         "cap_list": "PCI capabilities listing"
:       }
}
```

The detailed hardware information extracted is analyzed to identify hardware types and attributes for each hardware type, which are identified as literal attributes 420 or numerical attributes 430. The literal attributes 420 are aggregated using an aggregation function including a Bloom filter 440. The numerical attributes are aggregated using an aggregation function 450. The aggregated information 460 is provided for further processing.

Figure 5:
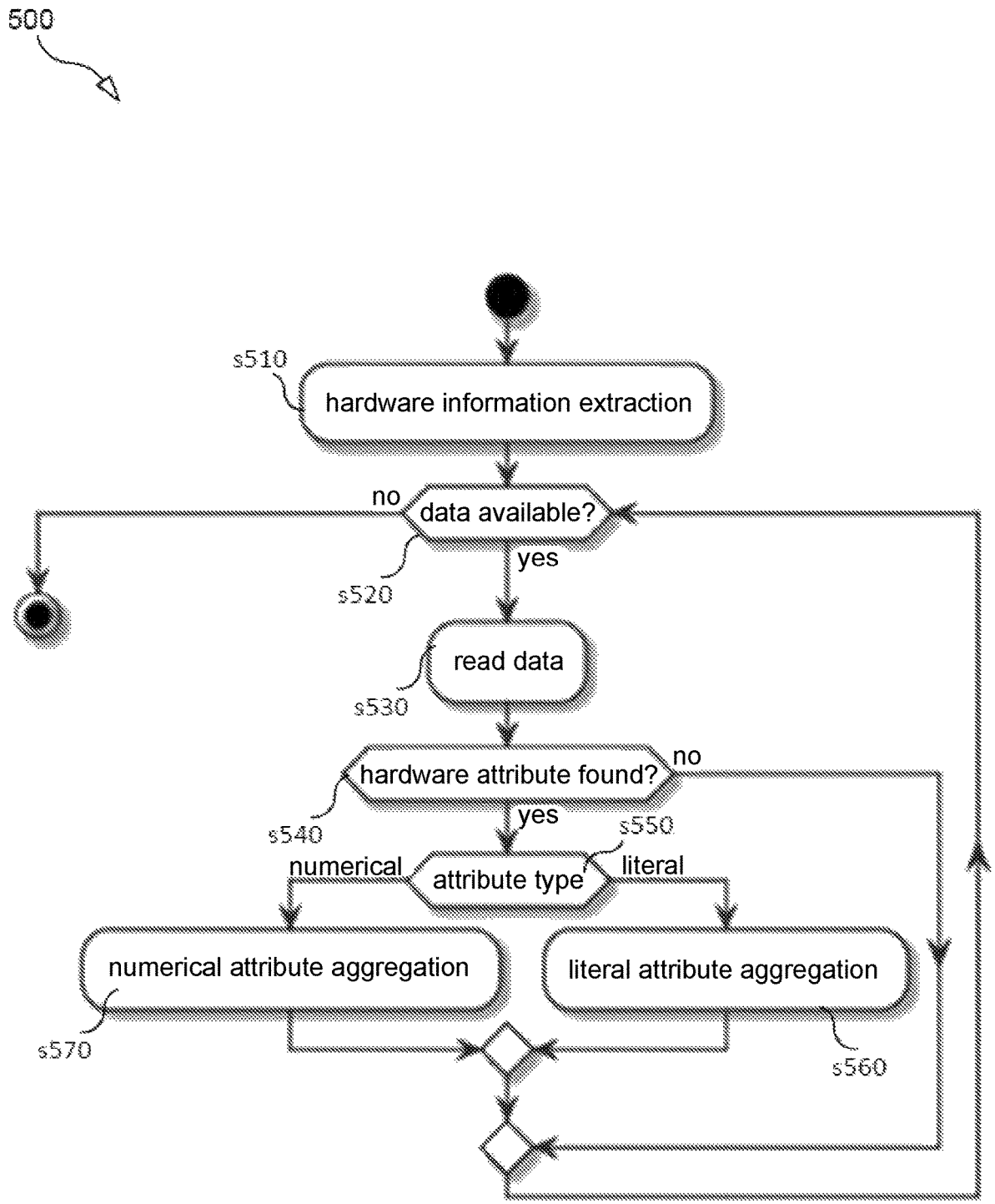
FIG. 5 is a flow chart illustrating a process for an exemplary aggregation function according to some embodiments.

FIG. 5 is a flow chart illustrating a process for an exemplary aggregation function according to some embodiments. The process 500 may begin with step s510.

Step s510 includes hardware information extraction. Detailed hardware information (all hardware capabilities) is extracted from the infrastructure using commands, such as lshw command in Linux. As disclosed herein, while reference is made to extracting hardware information, embodiments disclosed herein are not limited to hardware information and may include, for example, the extraction of any infrastructure capability information, which may include one or more resource types, including computing resources, hardware resources, software resources, and physical network function (PNF) resources. As further disclosed herein, while reference is made to extracting infrastructure capability information, such as hardware information, from the infrastructure using commands, such as lshw command in Linux, the extraction is not limited to this specific command or to operating system commands, and could be accomplished using one or more other available operating system commands or other available commands.

Step s520 includes querying whether there is available data from the extraction for each available resource type which, in this exemplary embodiment, is a hardware type. If not, the process 500 ends. If there is data available, the process proceeds to step s530 which includes reading the data.

Step s540 includes querying whether a hardware attribute is found. If not, then the process 500 continues to step s520. If an attribute is found, then the process continues to step s550.

Step s550 includes determining the attribute type; whether the attribute type is literal (e.g., text/string) or numerical (e.g., integer or floating point number). If the attribute type is literal, then the process continues to step s560, in which a literal attribute aggregation function is applied. If the attribute type is numerical, then the process continues to step s570, in which a numerical attribute aggregation function is applied. After performing either of step s560 or s570, process 500 returns to step s520 to determine whether more data is available. Process 500 ends when no more data is available.

Literal Attribute Aggregation

Figure 6:
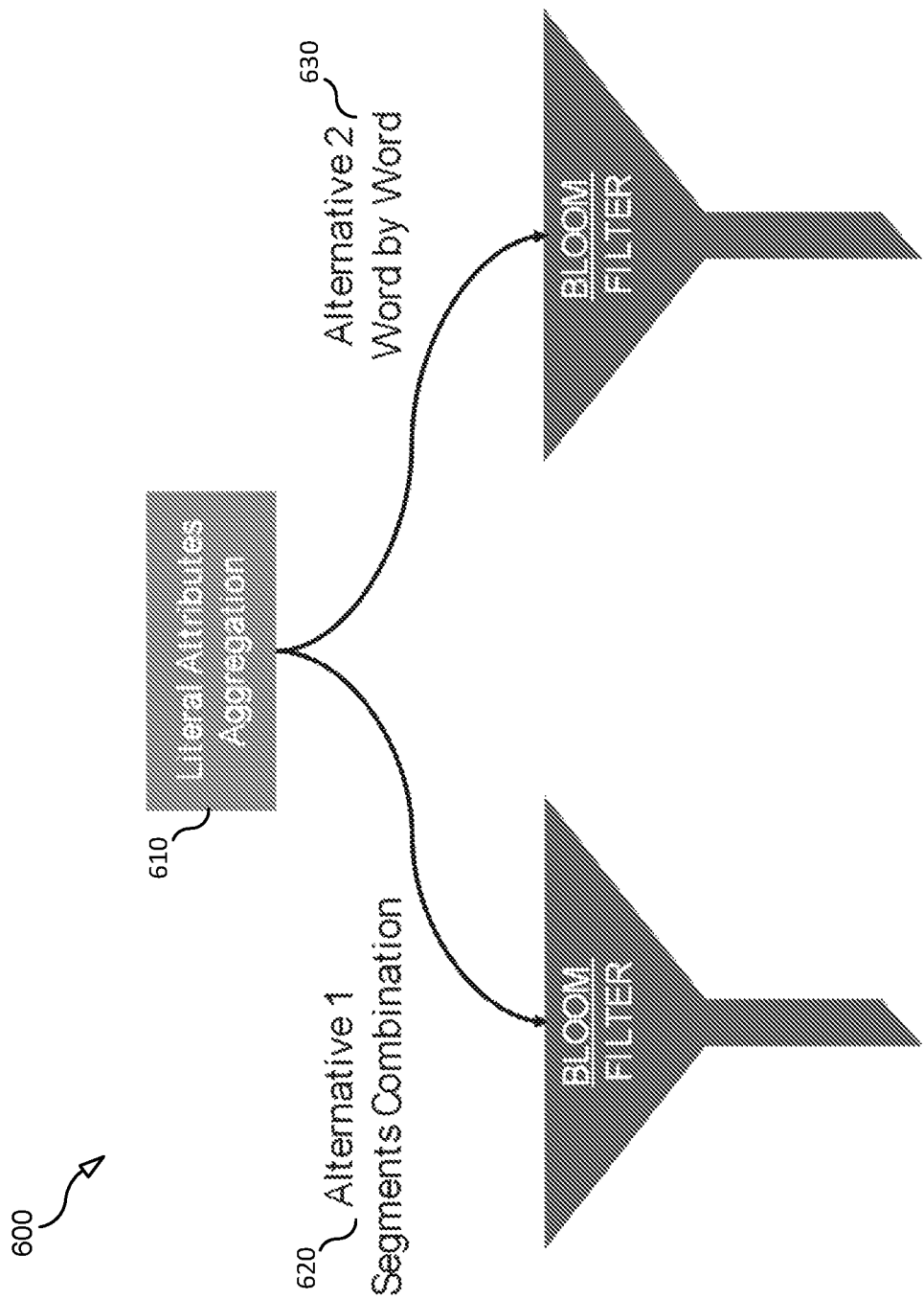
FIG. 6 is a flow diagram illustrating an exemplary literal attributes aggregation function according to some embodiments.

FIG. 6 is a flow diagram illustrating an exemplary literal attributes aggregation function according to some embodiments. Literal attributes aggregation function 600 includes literal attributes aggregation 610 that is performed by using different alternative processes. Alternative 1 620 is segments combination and Alternative 2 630 is word by word. The segments combination and the word by word literal attributes aggregation perform the aggregation function using a Bloom Filter (https://llimllib.github.io/bloomfilter-tutorial/). A Bloom filter is a data structure designed to indicate, rapidly and memory-efficiently, whether an element is present in a set. To realize this efficiency, a Bloom filter is a probabilistic data structure and indicates that the element either definitely is not in the set or may be in the set.

An example of hardware capability to be aggregated is:
"class": "display"
"vendor": "NVIDIA Corporation"

As disclosed herein, the literal attributes aggregation is performed by using different alternative processes for aggregating literal attributes.

The first alternative is called segment combination. In this alternative, all possible segments combinations of the attribute value are considered, and then each segment combination is added to the Bloom filter after tagging them with the class name/hardware type (e.g., display, memory) with one of the exemplary configurations: Config 1, Config 2, Config 3, or Config 4.

Figure 7:
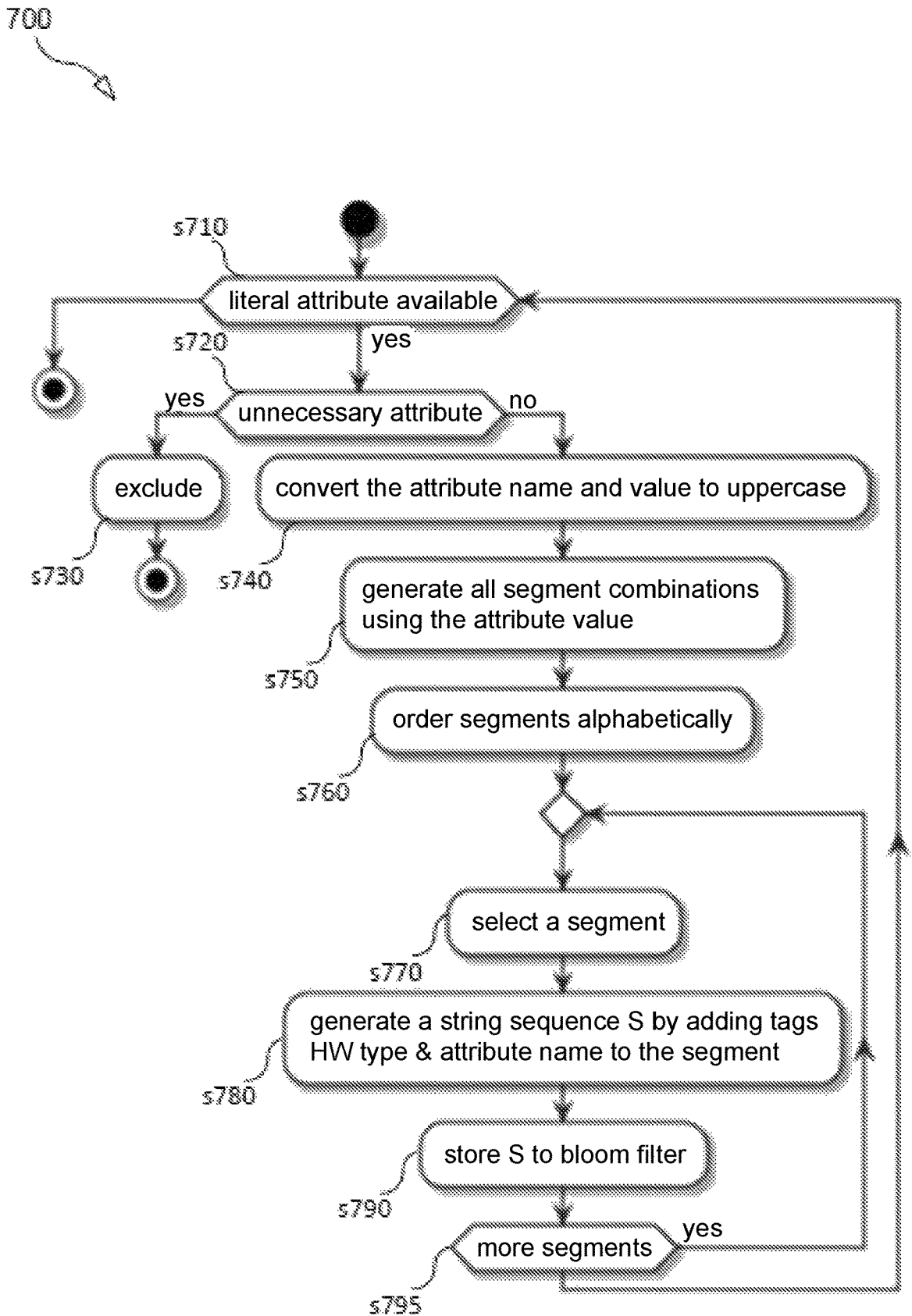
FIG. 7 is a flow chart illustrating a process for an exemplary literal attributes aggregation function using segments combination according to some embodiments.

Config 1 (segment ordered+attribute name included): in this exemplary configuration, each segment combination is tagged with the attribute name (e.g., vendor). Also, the words in each segment combination are ordered alphabetically before adding them to the Bloom filter in order to reduce the rate of false positives. This is needed because a request may not hold the same order of the words as in the extracted hardware information. FIG. 7 shows this alternative (i.e., segments combination) with this configuration (i.e., config 1).

FIG. 7 is a flow chart illustrating a process for an exemplary literal attributes aggregation function using segments combination according to some embodiments. The process 700 may begin with step s710.

Step s710 includes querying whether a literal attribute is available. If not, then process 700 ends. If a literal attribute is available, the process proceeds to step s720.

Step s720 includes querying whether the attribute is an unnecessary attribute. In some embodiments, a list of unnecessary attributes can be user-defined, using expertise knowledge. In some embodiments, a list of unnecessary attributes can be automatically generated based on some statistics, for instance, excluding high-frequency terms. In one exemplary embodiment, a term frequency (TF) and inverse document frequency (IDF) product (i.e., a TF-IDF) is used to evaluate the weights of the terms, and then based on the weights, a decision can be made regarding what to exclude. In some embodiments, the sanitize flag with the lshw command can be used to remove some sensitive information from the output, such as IP address or a serial number (i.e., $lshw—sanitize). If an attribute is determined to be unnecessary, the process 700 proceeds to step s730, where the attribute is excluded. If an attribute is determined not to be unnecessary, the process 700 proceeds to step s740.

Step s740 includes converting the attribute name and attribute value to uppercase.

Step s750 includes parsing the converted attribute name and attribute value and generating segment combinations.

Step s760 includes ordering the generated segment combinations alphabetically.

Step s770 includes selecting a segment combination. Step s780 includes generating a string sequence S by adding tags, including the hardware type and attribute name, to the segment combination. In step s790, the string sequence S is stored in a Bloom filter.

Step s795 including querying whether there are more segment combinations. If there are no more segment combinations, then the process 700 returns to step s710. If there are more segment combinations, the process 700 returns to step s770.

Config 2 (segment not ordered+attribute name included): in this exemplary configuration, each segment combination is tagged with the attribute name. However, the words in each segment combination are not ordered alphabetically.

Config 3 (segment ordered+attribute name not included): in this exemplary configuration, the segments are not tagged with the attribute name. However, the words in each segment combination are ordered alphabetically before adding them to the Bloom filter.

Config 4 (segment not ordered+attribute name not included): in this exemplary configuration, the segments are not tagged with the attribute name and not ordered alphabetically.

Figure 8:
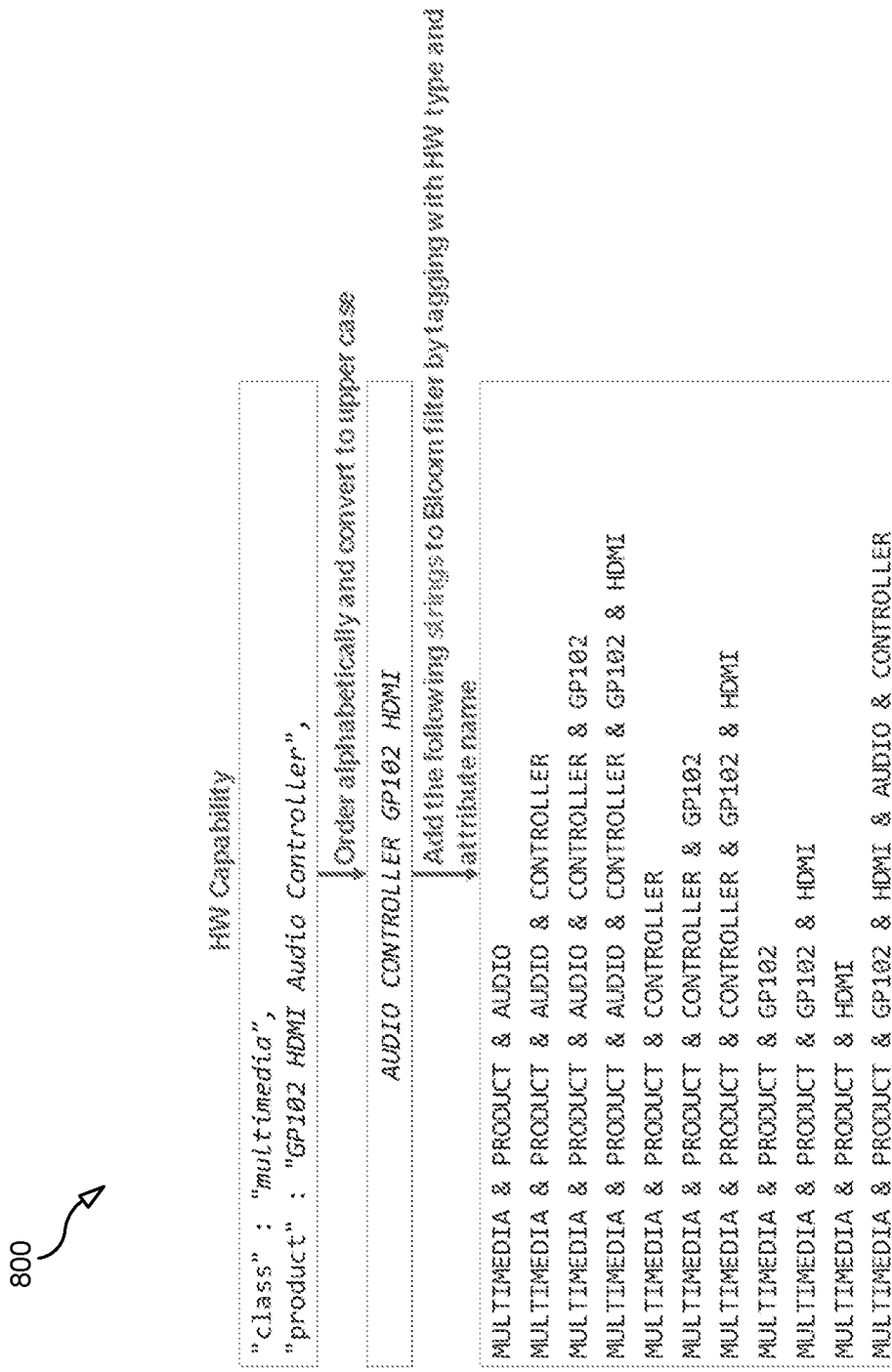
FIG. 8 illustrates an example of a literal attributes aggregation function using segments combination according to some embodiments

FIG. 8 illustrates an example of a literal attributes aggregation function using segments combination according to some embodiments. The example 800 shown in FIG. 8 is an example of Config 1. The literal attributes aggregation shown in example 800 is performed in accordance with the steps in FIG. 7.

The second alternative is called word by word. In this alternative, attribute values are added to the Bloom filter word by word. In accordance with one of the exemplary configurations: Config 5 or Config 6. In addition, exemplary embodiments include converting all the literal attributes to uppercase before adding them to the Bloom filter and excluding meaningless attributes and values.

Figure 9:
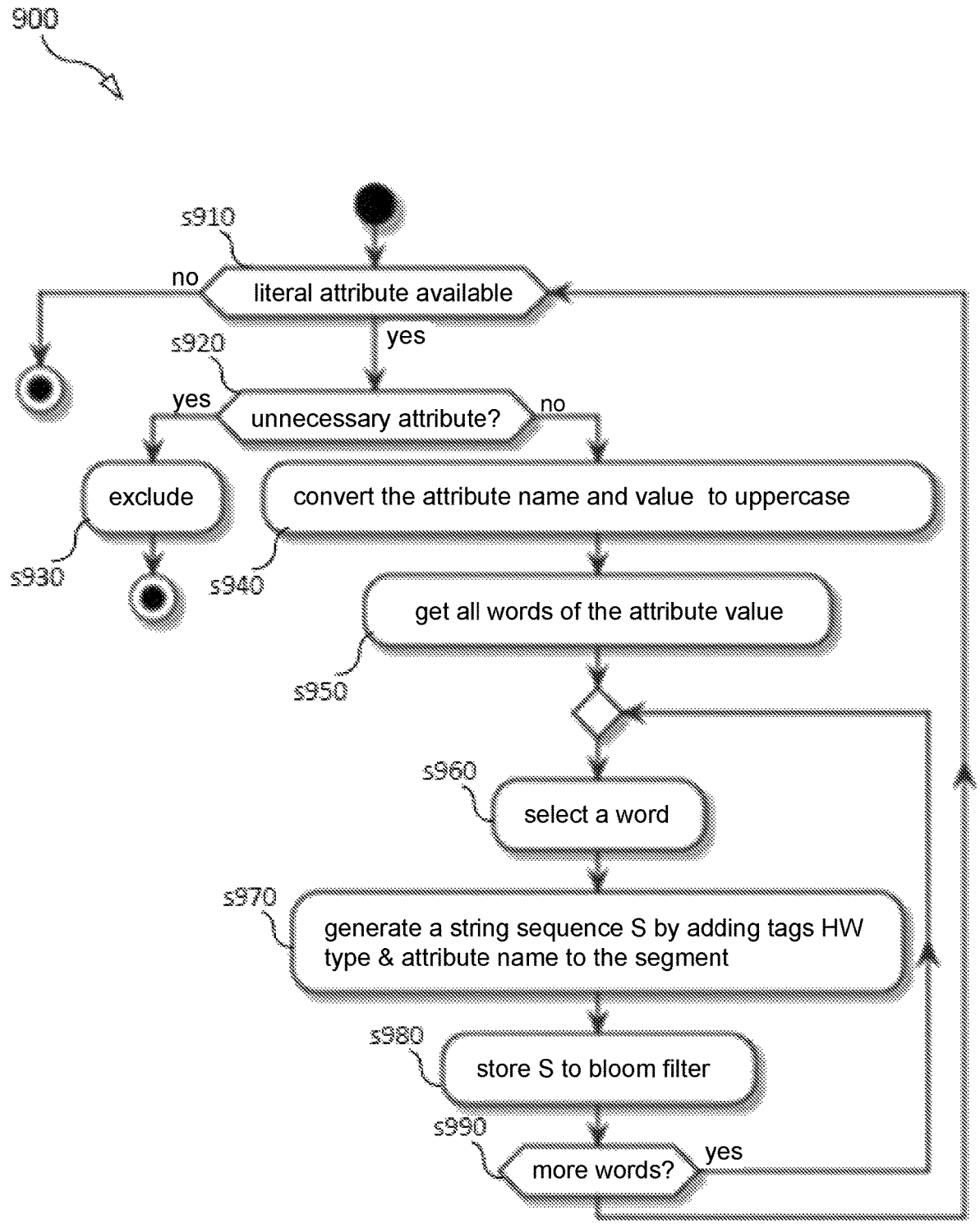
FIG. 9 is a flow chart illustrating a process for an exemplary literal attributes aggregation function using word by word according to some embodiments.

Config 5 (word by word+attribute name included): in this exemplary configuration, each word is tagged with the attribute name (e.g., vendor) before adding it to the Bloom filter. FIG. 9 shows this alternative (i.e., word by word) with this configuration (i.e., config 5).

FIG. 9 is a flow chart illustrating a process for an exemplary literal attributes aggregation function using word by word according to some embodiments. The process 900 may begin with step s910.

Step s910 includes querying whether a literal attribute is available. If not, then process 900 ends. If a literal attribute is available, the process proceeds to step s920.

Step s920 includes querying whether the attribute is an unnecessary attribute. In some embodiments, a list of unnecessary attributes can be user-defined, using expertise knowledge. In some embodiments, a list of unnecessary attributes can be automatically generated based on some statistics, for instance, excluding high-frequency terms. In one exemplary embodiment, a TF-IDF product is used to evaluate the weights of the terms, and then based on the weights, a decision can be made regarding what to exclude. In some embodiments, the sanitize flag with the lshw command can be used to remove some sensitive information from the output, such as IP address or a serial number (i.e., $lshw—sanitize). If an attribute is determined to be unnecessary, the process 900 proceeds to step s930, where the attribute is excluded. If an attribute is determined not to be unnecessary, the process 900 proceeds to step s940.

Step s940 includes converting the attribute name and attribute value to uppercase.

Step s950 includes parsing the converted attribute name and attribute value to identify all of the words.

Step s960 includes selecting a word.

Step s970 includes generating a string sequence S by adding tags, including the hardware type and attribute name, to the selected word. In step s980, the string sequence S is stored in a Bloom filter.

Step s990 including querying whether there are more words. If there are more words, the process 900 returns to step s960. If there are no more words, then the process 900 returns to step s910 and continues until no more literal attributes are available.

Config 6 (word by word+attribute name not included): in this exemplary configuration, there is no tagging. The words are directly added to the Bloom filter one by one.

Figure 10:
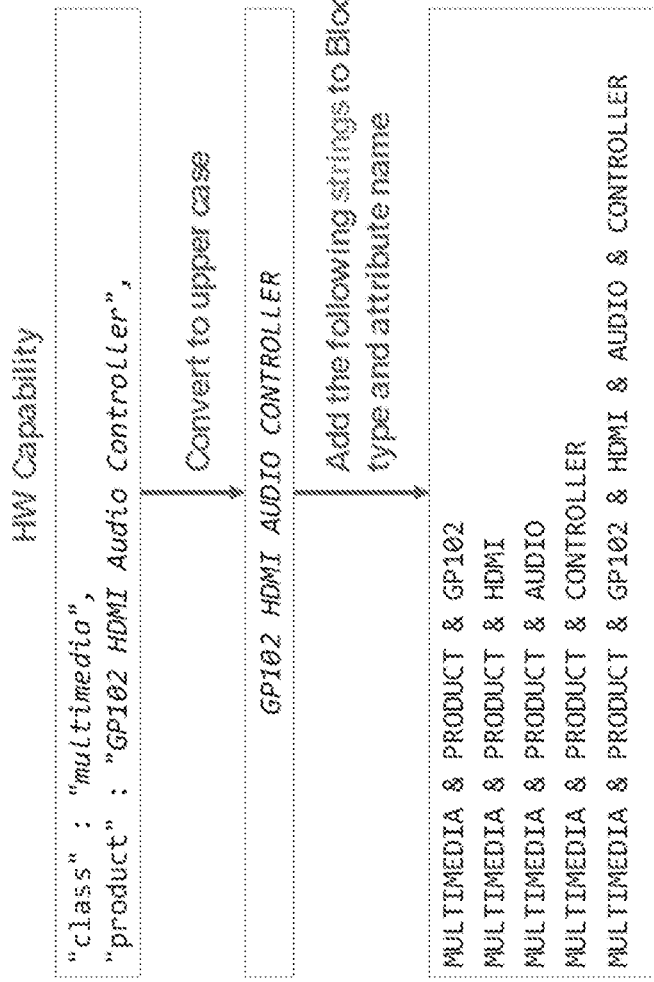
FIG. 10 illustrates an example of a literal attributes aggregation function using word by word according to some embodiments.

FIG. 10 illustrates an example of a literal attributes aggregation function using word by word according to some embodiments. The example 1000 shown in FIG. 10 is an example of Config 5. The literal attributes aggregation shown in example 1000 is performed in accordance with the steps in FIG. 9.

Numerical Attributes Aggregation

Figure 11:
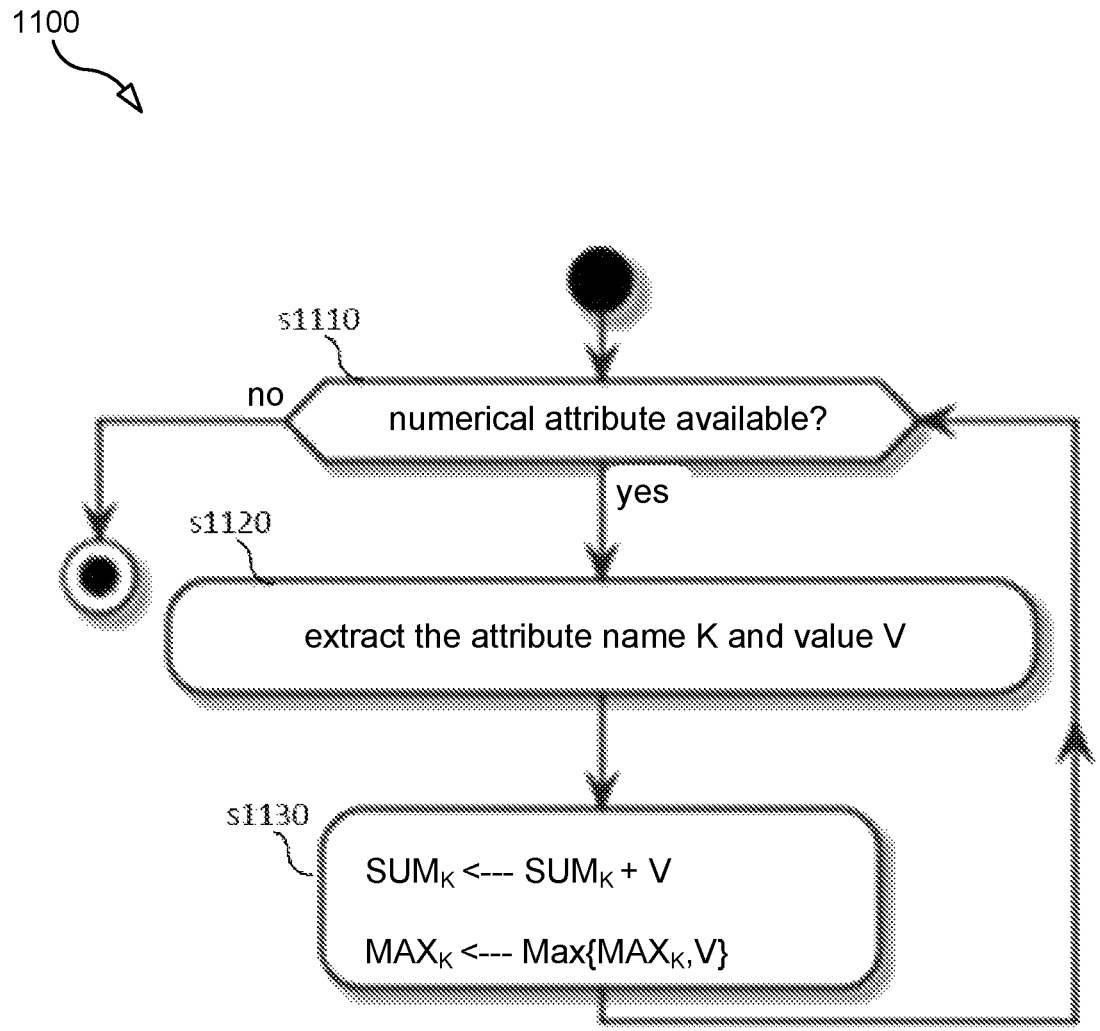
FIG. 11 is a flow chart illustrating a process for an exemplary numerical attributes aggregation function according to some embodiments.

Turning now to the numerical attributes, an exemplary process of aggregating the numerical attributes is shown in FIG. 11. The numerical attributes, such as, for example, "cores": "4" are handled differently than the literal attributes. They are not added to a Bloom filter, but instead, for each hardware type, the numerical attributes are aggregated and exposed according to a defined set of aggregation functions: the sum of all similar attributes (e.g., the total number of cores of all CPUs) and their maximum value (e.g., the maximum number of CPU cores hardware can support).

FIG. 11 is a flow chart illustrating a process for an exemplary numerical attributes aggregation function according to some embodiments. The process 1100 may begin with step s1110.

Step s1110 includes querying whether a numerical attribute is available. If not, then process 1100 ends. If a numerical attribute is available, the process proceeds to step s1120.

Step s1120 includes extracting the attribute name K and the value V from the numerical attribute information.

Step s1130 includes carrying out a first aggregation function according to:

$$SUM_K \leftarrow SUM_K + V;\text{ and}$$

carrying out a second aggregation function according to:

$$MAX_K \leftarrow MAX(MAX_K, V).$$

After carrying out the aggregation functions, the process 1100 proceeds to step s1110 and continues until no more numerical attributes are available.

Matching Function

Figure 12:
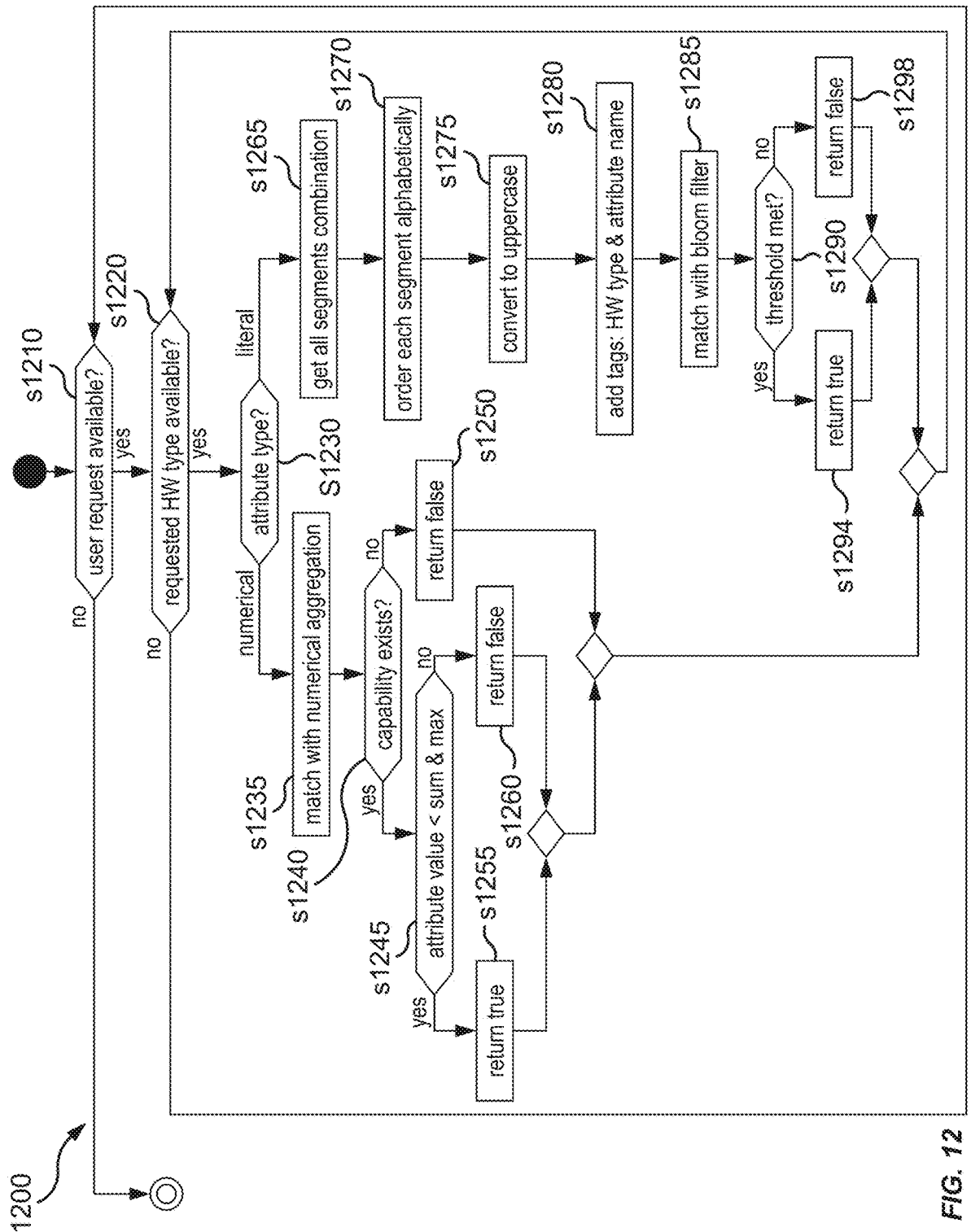
FIG. 12 is a flow chart illustrating a process for an exemplary matching function according to some embodiments.

A request for a resource, such as a user request, is made and will be received as part of the method and apparatus disclosed herein. In embodiments disclosed herein, the request for a resource can include a requested resource type and, for each requested resource type, attribute information including an attribute name and an attribute value. The requested resource types may be one or more of: computing resources, hardware resources, software resources, and physical network function (PNF) resources. When a request for a resource, such as a user request, is received, for each requested hardware type, for example, the attribute type is first checked. The attribute type can be either numerical or literal. The process of the matching function is shown in FIG. 12.

In embodiments disclosed herein, exact matching is performed for the numerical attributes. They are matched against the aggregated model generated from numerical attributes aggregation. The requested attribute value is compared with the values of the two aggregation functions described above, i.e., sum and max. If the attribute value is smaller than the sum and the max, then the system returns true, otherwise, it returns false.

In embodiments disclosed herein, probabilistic matching is performed for literal attributes. The request is pre-processed before matching it with the aggregated information stored in the Bloom filter. According to the selected configuration, a set of sequences are produced and these sequences are used to match against the Bloom filter. For example, with config 1, all possible segments combinations of the attribute value are generated, ordered alphabetically, then each segment is tagged with the requested hardware type and the attribute name to produce a set of sequences. All generated sequences are then matched against the Bloom filter. A matching threshold is defined, such as, for example, 50%, and if the threshold is met, "true" is returned, otherwise, "false" is returned.

As the matching threshold increases, the likelihood of correct matching of the user requirements with the aggregated hardware capabilities increases. However, some user requirements which are not critical, or which can be satisfied by other similar/alternative capabilities will not be matched. Hence, there is a tradeoff between the matching threshold and the likelihood of correct matching. A lower matching threshold can tolerate higher inaccuracy of user requirements, and meanwhile, it might result in higher false positive.

FIG. 12 is a flow chart illustrating a process for an exemplary matching function according to some embodiments. The process 1200 may begin with step s1210.

Step s1210 includes querying whether a user request is available. If not, then process 1200 ends. If a user request is available, the process proceeds to step s1220.

Step s1220 includes querying whether a hardware type is available. If not, then process 1200 returns to step s1210. If a hardware type is available, the process proceeds to step s1230.

Step s1230 includes determining whether the attribute type is numerical or literal. If the attribute type is numerical, then the process 1200 proceeds to step s1235.

Steps s1235 to s1260 include comparing the attribute information with the aggregated numerical attributes information to determine whether the requested resource matches the available resource types. To determine whether there is a match, step s1240 includes querying to determine whether the capability exists. If the capability exists, the process 1200 proceeds to step s1245, comparing the numerical attribute value with the value of SUM and with the value of MAX. If the numerical attribute value is less than the value of SUM plus MAX, then there is a match and, in step s1255, the process 1200 returns "true." If the numerical attribute value is not less than the value of SUM plus MAX, then there is no match and, in step s1260, the process 1200 returns "false." The process 1200 then returns to step s1220. If the capability does not exist, the process 1200 proceeds to step s1250 and returns "false." Again, the process 1200 then returns to step s1220.

If, in step s1230, the attribute type is determined to be literal, then the process 1200 proceeds to step s1265.

Step s1265 includes parsing the literal attribute value to identify each segment and generating segment combinations. Then, for each second segment combination: in step s1270, ordering the generated segment combinations alphabetically; in step s1275, converting the generated segment combinations to uppercase; and in step s1280, adding the resource (hardware) type and the attribute name to the segment combination.

Then, for each second segment combination: in step s1285, comparing the second segment combination with the aggregated literal attributes information stored in the Bloom filter; and, in step s1290, determining whether a pre-determined matching threshold is met based on the comparison. If the threshold is met, in step s1294, returning "true," and if the threshold is not met, in step s1298, returning "false." The process 1200 then returns to step s1220.

Figure 13:
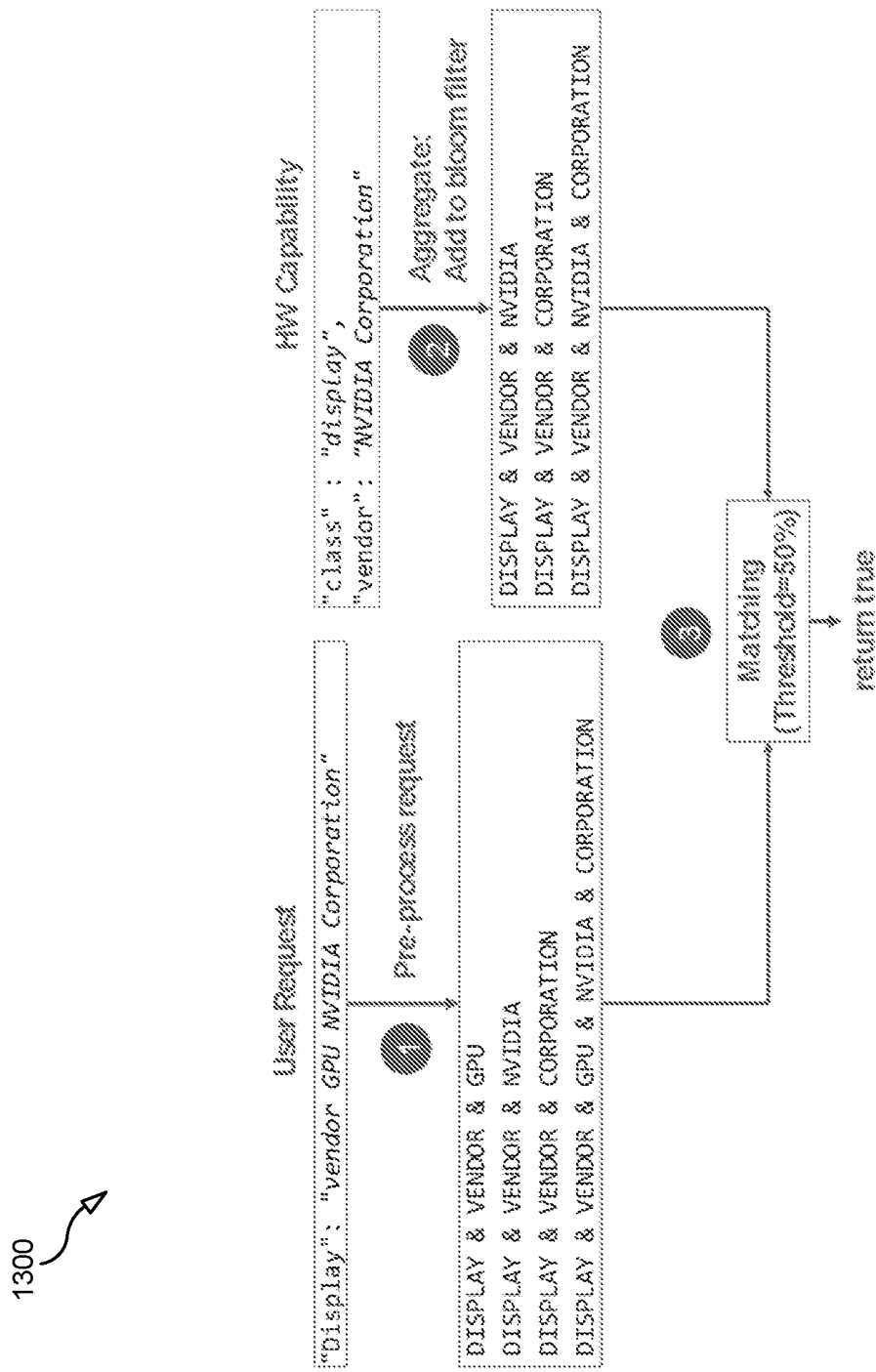
FIG. 13 illustrates an example of a matching function according to some embodiments.

FIG. 13 illustrates an example of a matching function according to some embodiments. Referring to FIG. 13, an example of literal attributes aggregation with word by word alternative and its matching with the user request is provided. In the example, the first word of the attribute in the user request represents the attribute name. First, the user request is pre-processed; step (1), where all words in the user request attribute value, and the whole attribute value are tagged with the attribute name (i.e., vendor) and the class name/hardware type (i.e., display). Also, all words are converted to uppercase.

Next, step (2) shows the hardware capabilities aggregation. In this example, the attribute value consists of two words. Each word and also the whole sentence are tagged with the attribute name and the class name. Similarly, they are converted to uppercase letters.

In step (3), the matching is performed. It returns true when 50% of the pre-processed request is matched with the aggregated information. As the matching threshold is increased, e.g., 60%, the matching function returns false.

The performance of the different algorithms were evaluated by running experiments with the configurations described above for hardware capabilities aggregation:

Config 1—segments based (segment ordered+attribute name included)
Config 2—segments based (segment not ordered+attribute name included)
Config 3—segments based (segment ordered+attribute name not included)
Config 4—Segments based (segment not ordered+attribute name not included)
Config 5—word by word (attribute name included)
Config 6—word by word (attribute name not included)

1000 test cases were generated. Each test case represents a user request comprised of one literal attribute. Each request is pre-processed and tagged with the attribute name.

Figure 14:
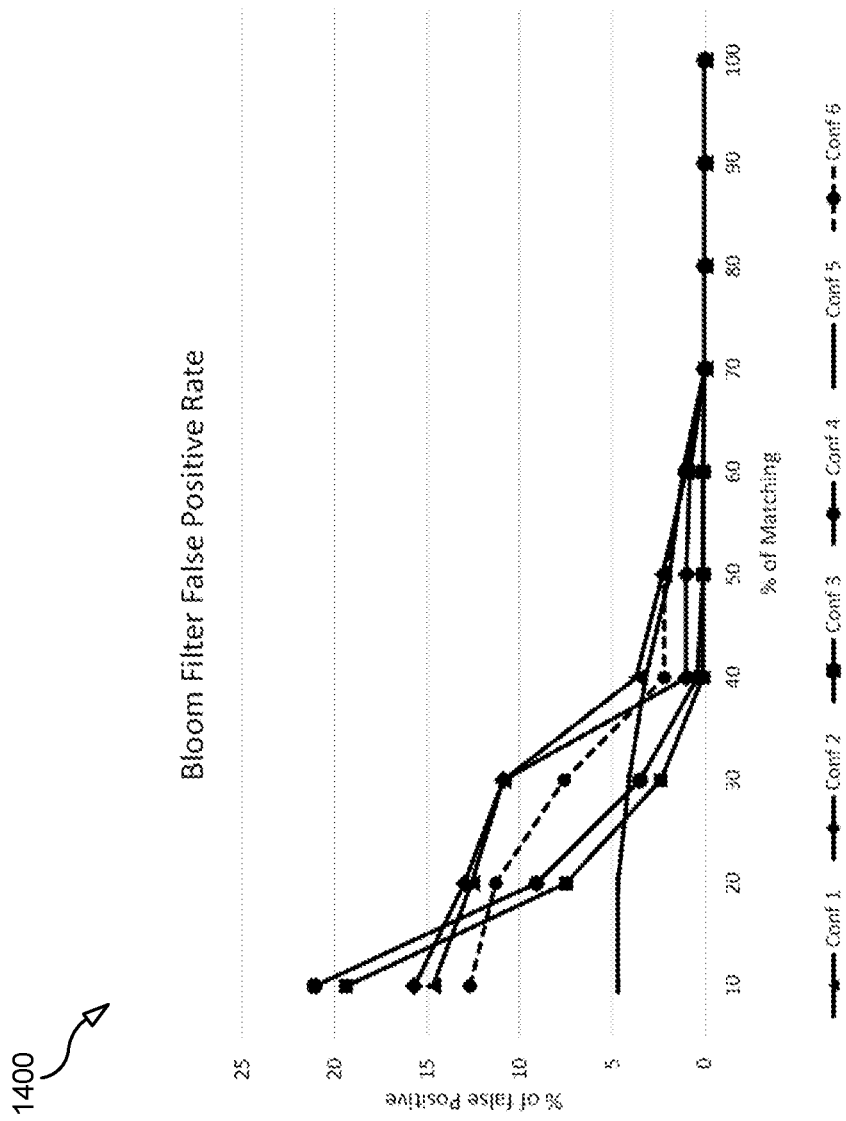
FIG. 14 is a graph illustrating the Bloom filter false positive rate for different configurations in an exemplary implementation of the method and apparatus according to some embodiments.

FIG. 14 is a graph illustrating the Bloom filter false positive rate for different configurations in an exemplary implementation of the method and apparatus according to some embodiments. Referring to FIG. 14, the percentage of false positives when matching the user requests with the aggregated hardware capabilities is provided. Config 5 (word by word+attribute name included) shows the best results for a matching threshold between 10% and 60%. It is observed that, as the matching threshold increases to more than 60%, all configurations perform very similarly.

In addition, in the experiments, it is also observed that Config 6 (word by word+attribute name not included) has a large number of false negatives. This is because the entries in the Bloom filter are not tagged with the attribute name which results in false matching.

The following is a chart illustrating the Bloom filter false positive rate for different configurations in an exemplary implementation of the method and apparatus according to some embodiments:

Attribute #1: "display": "GPU NVIDIA"
Attribute #2: "product": "Titan XP"

Assume that attribute #1 is matched, while attribute #2 is not. In such a case, weights for these attributes can be assigned. Assume a request includes m attributes, r0, r1, ..., rm−1, then the weight of rk is $wk=2m-1-k/(2m-1)$.

Example: $m=2$, $r0=T$: A B C, $w0=\frac{2}{3}$, $r1=T$: X Y, $w1=\frac{1}{3}$

The weights for attribute #1 and attribute #2 are $\frac{2}{3}$ and $\frac{1}{3}$. Given a matching threshold $\varphi$, an aggregated value can be the sum of weighted matched values:

$$V=1*\tfrac{2}{3}+0*\tfrac{1}{3}=\tfrac{2}{3}, \text{ matched if } V>=\varphi$$

Figure 15:
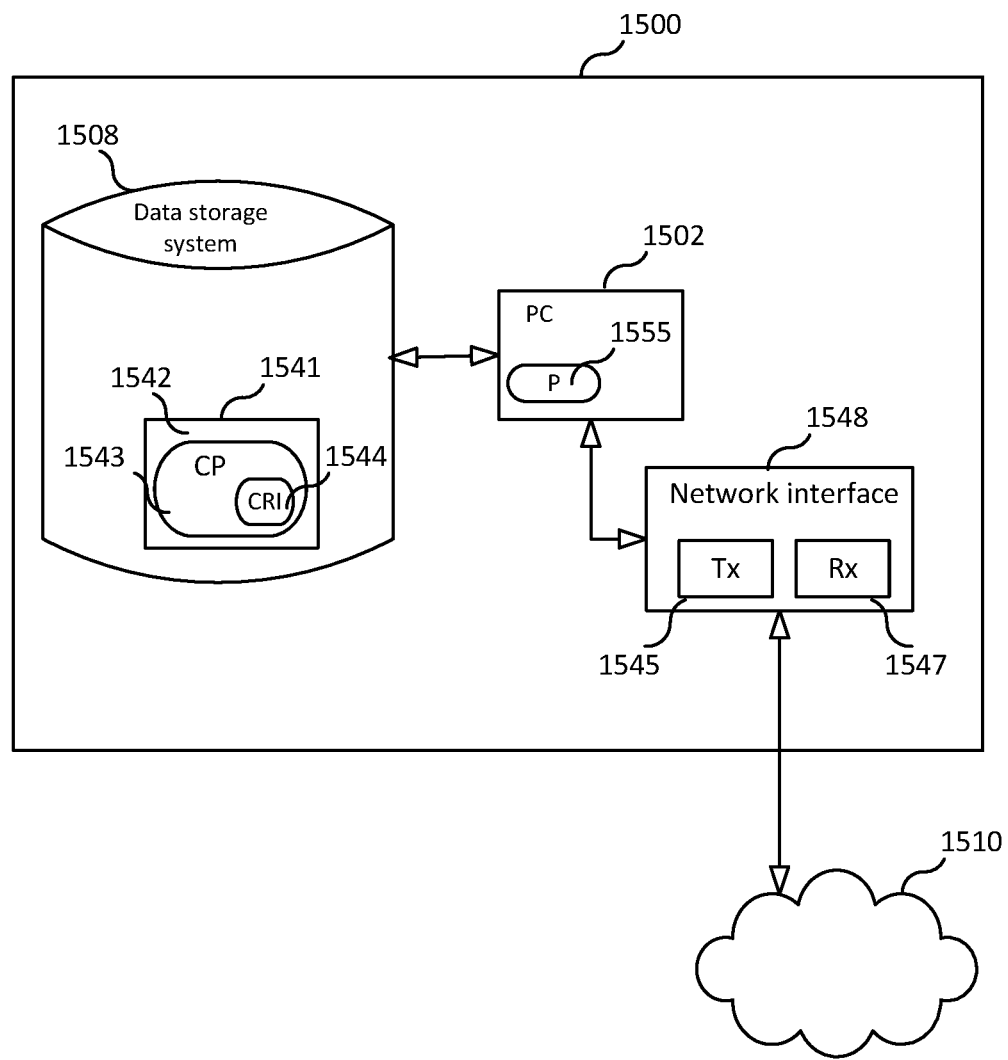
FIG. 15 is a block diagram of an apparatus according to some embodiments.

FIG. 15 is a block diagram of an apparatus 1500 according to some embodiments. Apparatus 1500 may be a network node, such as a base station, a computer, a server, a wireless sensor device, or any other unit capable of implementing the embodiments disclosed herein. As shown in FIG. 15, apparatus 1500 may comprise: processing circuitry (PC) 1502, which may include one or more processors (P) 1555 (e.g., a general purpose microprocessor and/or one or more other processors, such as an application specific integrated circuit (ASIC), field-programmable gate arrays (FPGAs), and the like), which processors 1555 may be co-located in a single housing or in a single data center or may be geographically distributed (i.e., apparatus 1500 may be a distributed apparatus); a network interface 1548 comprising a transmitter (Tx) 1545 and a receiver (Rx) 1547 for enabling apparatus 1500 to transmit data to and receive data from other nodes connected to network 1510 (e.g., an Internet Protocol (IP) network) to which network interface 1548 is connected; and a local storage unit (a.k.a., "data storage system") 1508, which may include one or more non-volatile storage devices and/or one or more volatile storage devices. In embodiments where PC 1502 includes a programmable processor, a computer program product (CPP) 1541 may be provided. CPP 1541 includes a computer readable medium (CRM) 1542 storing a computer program (CP) 1543 comprising computer readable instructions (CRI) 1544. CRM 1542 may be a non-transitory computer readable medium, such as, magnetic media (e.g., a hard disk), optical media, memory devices (e.g., random access memory, flash memory), and the like. In some embodiments, the CRI 1544 of computer program 1543 is configured such that when executed by PC 1502, the CRI causes apparatus 1500 to perform steps described herein (e.g., steps described herein with reference to the flow charts). In other embodiments, apparatus 1500 may be

|        | % of Matching |       |       |      |      |      |    |    |    |     |
|        | 10    | 20    | 30    | 40   | 50   | 60   | 70 | 80 | 90 | 100 |
|--------|-------|-------|-------|------|------|------|----|----|----|-----|
| Conf 1 | 14.7% | 12.6% | 10.9% | 3.7% | 2.3% | 1%   | 0% | 0% | 0% | 0%  |
| Conf 2 | 15.7% | 13%   | 10.9% | 1%   | 1%   | 0.8% | 0% | 0% | 0% | 0%  |
| Conf 3 | 19.4% | 7.5%  | 2.4%  | 0.1% | 0.1% | 0.1% | 0% | 0% | 0% | 0%  |
| Conf 4 | 21.1% | 9.1%  | 3.5%  | 0.4% | 0.1% | 0.1% | 0% | 0% | 0% | 0%  |
| Conf 5 | 4.7%  | 4.7%  | 4.1%  | 3.2% | 1.9% | 1.2% | 0% | 0% | 0% | 0%  |
| Conf 6 | 12.7% | 11.3% | 7.6%  | 2.2% | 2.2% | 1.1% | 0% | 0% | 0% | 0%  |

Matching Function for Request with Multiple Attributes

In some embodiments, when the user request includes more than one attribute, the user can specify the criticality level of each attribute, and accordingly, the matching percentage is defined. In some embodiments, the user may provide the request with attributes ordered from the most critical to the least critical. An example request with two attributes is the following:

configured to perform steps described herein without the need for code. That is, for example, PC 1502 may consist merely of one or more ASICs. Hence, the features of the embodiments described herein may be implemented in hardware and/or software.

Figure 16:
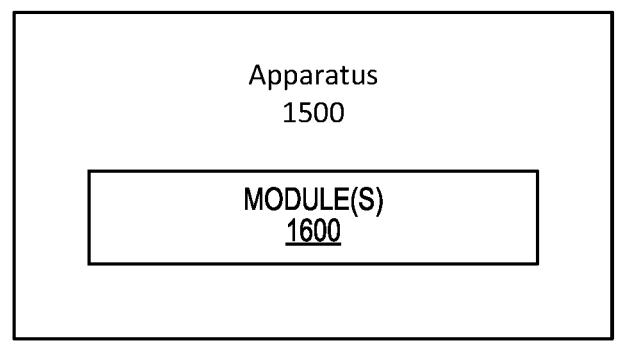
FIG. 16 is another block diagram of an apparatus according to some embodiments.

FIG. 16 is a block diagram of an apparatus according to some embodiments. The apparatus 1500 includes one or more modules 1600, each of which is implemented in software. The module(s) 1600 provide the functionality of apparatus 1500 described herein (e.g., steps described herein with reference to the flow charts).

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A computer-implemented method for aggregating and exposing infrastructure capability information, the method comprising:
   extracting infrastructure capability information, wherein the infrastructure capability information includes available resource types and, for each available resource type, first attribute information including a first attribute name and a first attribute value;
   for each available resource type:
   determining whether the first attribute value is a literal type attribute value or a numerical type attribute value;
   for an attribute value determined to be the literal type, aggregating the first attribute information to generate aggregated literal attributes information; and
   for an attribute value determined to be the numerical type, aggregating the first attribute information to generate aggregated numerical attributes information;
   receiving a request for a resource including requested resource types and, for each requested resource type, second attribute information including a second attribute name and a second attribute value;
   for each requested resource type:
   determining whether the second attribute value is a literal type attribute value or a numerical type attribute value;
   for an attribute value determined to be the literal type, processing the second attribute information to generate processed second attribute information and comparing the processed second attribute information with the aggregated literal attributes information to determine whether the requested resource matches the available resource types; and
   for an attribute value determined to be the numerical type, comparing the second attribute information with the aggregated numerical attributes information to determine whether the requested resource matches the available resource types.

2. The method according to claim 1, wherein extracting infrastructure capability information includes extracting the infrastructure capability information using one or more operating system commands.

3. The method according to claim 1, wherein the resource types are one or more of: computing resources, hardware resources, software resources, and physical network function (PNF) resources.

4. The method according to claim 1, wherein determining whether the first attribute value or the second attribute value is a literal type attribute value includes determining whether the first attribute value or the second attribute value is a text string.

5. The method according to claim 1, wherein determining whether the first attribute value or the second attribute value is a numerical type attribute value includes determining whether the first attribute value or the second attribute value is an integer or a floating point number.

6. The method according to claim 1, wherein aggregating the first attribute information to generate aggregated literal attributes information includes:
   determining whether the first attribute information is unnecessary;
   if the first attribute information is not unnecessary, converting the first attribute name and first attribute value to uppercase;
   parsing the converted first attribute value to identify each segment and generating first segment combinations;
   ordering the generated first segment combinations alphabetically;
   for each first segment combination:
   generating a string sequence S by adding the resource type and the first attribute name to the segment combination; and
   storing string sequence S to a Bloom filter.

7. The method according to claim 1, wherein aggregating the first attribute information to generate aggregated literal attributes information includes:
   determining whether the first attribute information is unnecessary;
   if the first attribute information is not unnecessary, converting the first attribute name and first attribute value to uppercase;
   parsing the converted first attribute value to identify each word;

for each word:
generating a string sequence S by adding the resource type and the first attribute name to the word; and
storing string sequence S to a Bloom filter.

8. An apparatus comprising:
processing circuitry; and
a memory containing instructions executable by the processing circuitry for aggregating and exposing infrastructure capability information, the apparatus operative to:
extract infrastructure capability information, wherein the infrastructure capability information includes available resource types and, for each available resource type, first attribute information including a first attribute name and a first attribute value;
for each available resource type:
determine whether the first attribute value is a literal type attribute value or a numerical type attribute value;
for an attribute value determined to be the literal type, aggregate the first attribute information to generate aggregated literal attributes information; and
for an attribute value determined to be the numerical type, aggregate the first attribute information to generate aggregated numerical attributes information;
receive a request for a resource including requested resource types and, for each requested resource type, second attribute information including a second attribute name and a second attribute value;
for each requested resource type:
determine whether the second attribute value is a literal type attribute value or a numerical type attribute value;
for an attribute value determined to be the literal type, process the second attribute information to generate processed second attribute information and compare the processed second attribute information with the aggregated literal attributes information to determine whether the requested resource matches the available resource types; and
for an attribute value determined to be the numerical type, compare the second attribute information with the aggregated numerical attributes information to determine whether the requested resource matches the available resource types.

9. The apparatus according to claim 8, wherein extracting infrastructure capability information includes extracting the infrastructure capability information using one or more operating system commands.

10. The apparatus according to claim 8, wherein the resource types are one or more of: computing resources, hardware resources, software resources, and physical network function (PNF) resources.

11. The apparatus according to claim 8, wherein determining whether the first attribute value or the second attribute value is a literal type attribute value includes determining whether the first attribute value or the second attribute value is a text string.

12. The apparatus according to claim 8, wherein determining whether the first attribute value or the second attribute value is a numerical type attribute value includes determining whether the first attribute value or the second attribute value is an integer or a floating point number.

13. The apparatus according to claim 8, wherein aggregating the first attribute information to generate aggregated literal attributes information includes:
determining whether the first attribute information is unnecessary;
if the first attribute information is not unnecessary, converting the first attribute name and first attribute value to uppercase;
parsing the converted first attribute value to identify each segment and generating first segment combinations;
ordering the generated first segment combinations alphabetically;
for each first segment combination:
generating a string sequence S by adding the resource type and the first attribute name to the segment combination; and
storing string sequence S to a Bloom filter.

14. The apparatus according to claim 8, wherein aggregating the first attribute information to generate aggregated literal attributes information includes:
determining whether the first attribute information is unnecessary;
if the first attribute information is not unnecessary, converting the first attribute name and first attribute value to uppercase;
parsing the converted first attribute value to identify each word;
for each word:
generating a string sequence S by adding the resource type and the first attribute name to the word; and
storing string sequence S to a Bloom filter.

15. The apparatus according to claim 8, wherein aggregating the first attribute information to generate aggregated numerical attributes information includes:
extracting the first attribute name K from the first attribute information;
extracting the first attribute value V from the first attribute information;
carrying out a first aggregation function according to:

$$SUM_K \leftarrow SUM_K + V$$

carrying out a second aggregation function according to:

$$MAX_K \leftarrow MAX(MAX_K, V).$$

16. The apparatus according to claim 8, wherein processing the second attribute information to generate processed second attribute information includes:
parsing the second attribute value to identify each segment and generating second segment combinations;
for each second segment combination:
ordering the generated second segment combinations alphabetically;
converting the generated second segment combinations to uppercase; and
adding the resource type and the second attribute name to the second segment combination.

17. The apparatus according to claim 16, wherein comparing the processed second attribute information with the aggregated literal attributes information to determine whether the requested resource matches the available resource types includes:
for each second segment combination:
comparing the second segment combination with the aggregated literal attributes information stored in the Bloom filter; and
determining whether a pre-determined matching threshold is met based on the comparison.

18. The apparatus according to claim 15, wherein comparing the second attribute information with the aggregated numerical attributes information to determine whether the requested resource matches the available resource types includes:

determining a match if the second attribute value is less than the value of SUM and less than the value of MAX.

19. A network node configured for aggregating and exposing infrastructure capability information in a network according to claim 8.

20. A computer program product comprising a non-transitory computer readable medium storing a computer program comprising instructions which, when executed by processing circuitry, causes the processing circuitry to perform the method of claim 1.

* * * * *